Figure 1:
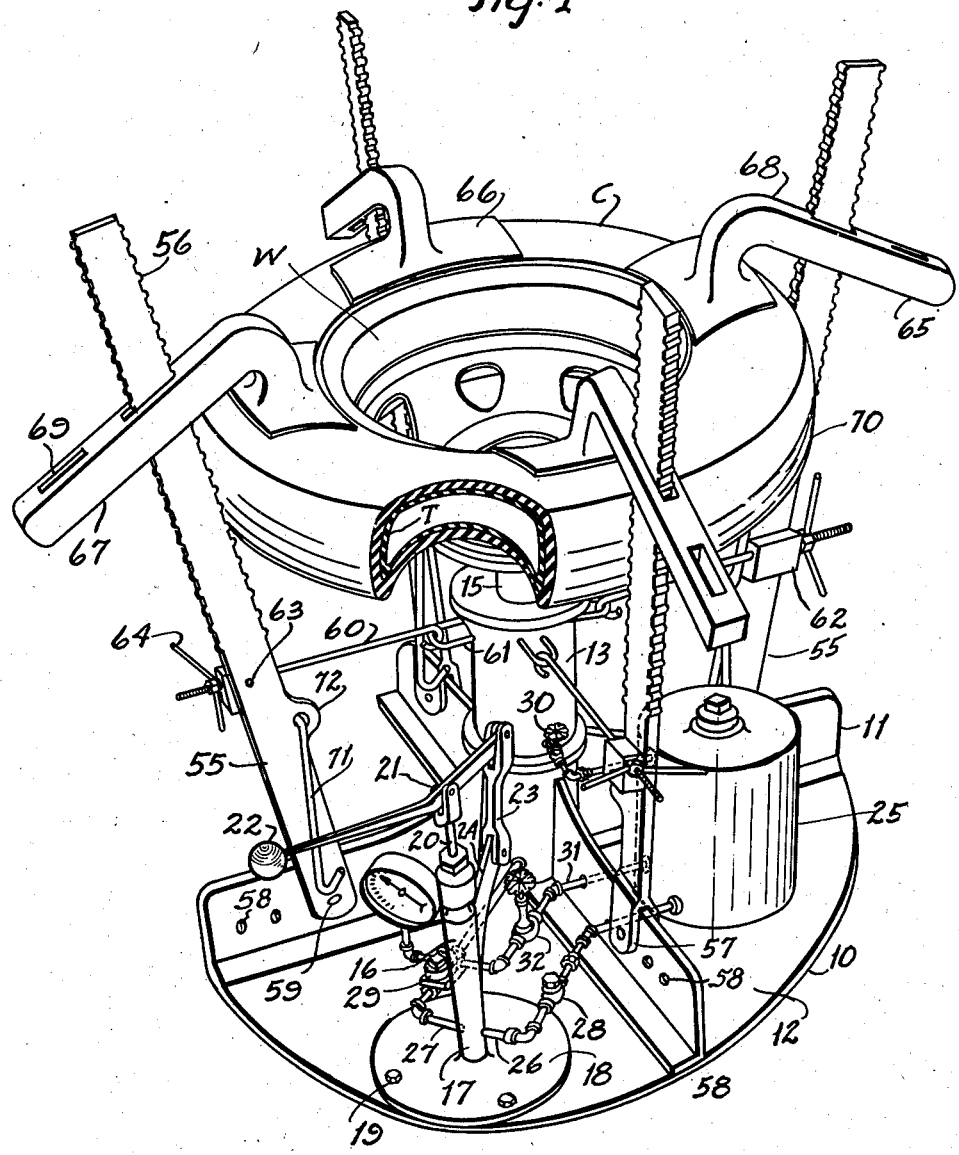

May 28, 1946.　　　C. A. TALLEY ET AL　　　2,401,118
TIRE REMOVING AND SPREADING DEVICE
Filed July 12, 1943　　　3 Sheets-Sheet 1

Inventors
CLAUDE A. TALLEY AND
WALTER E. GRISHAM

By

Attorneys

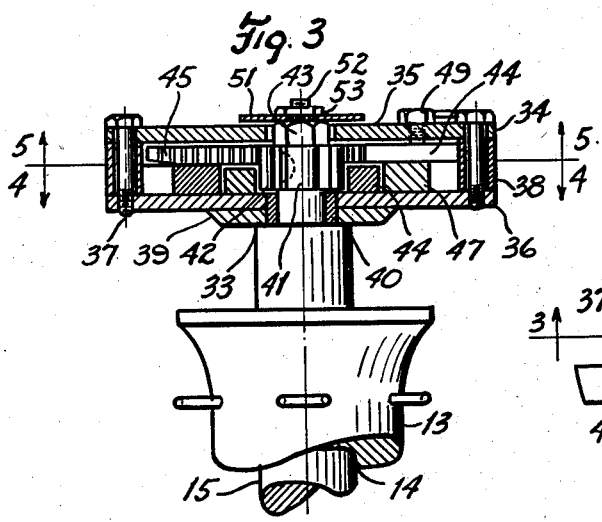
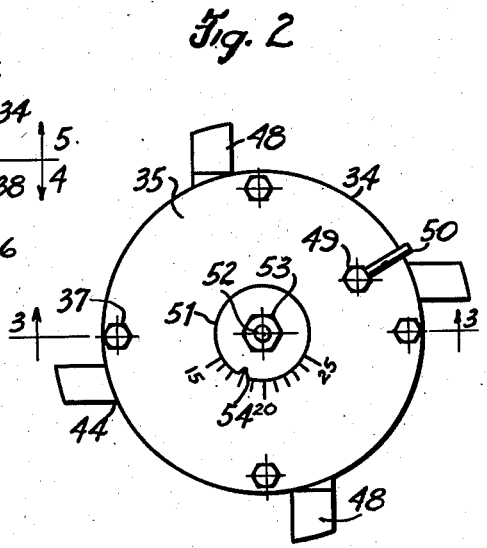
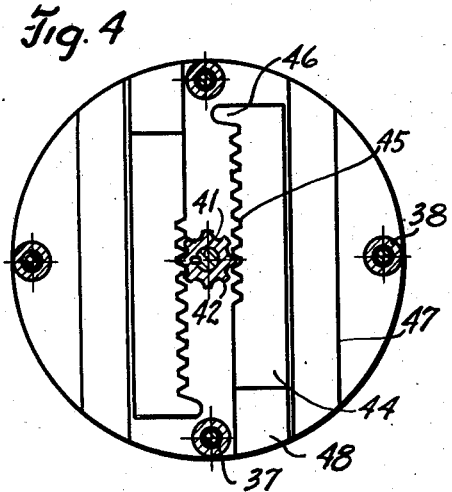
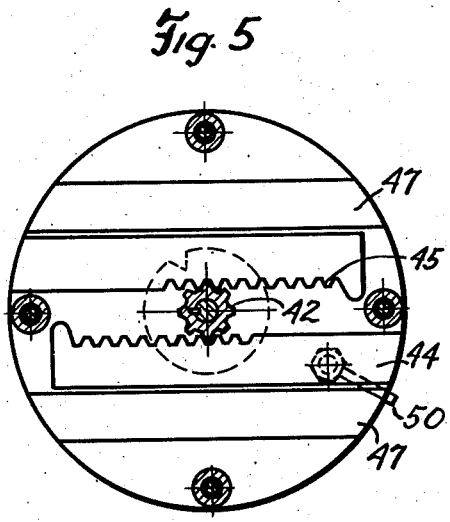
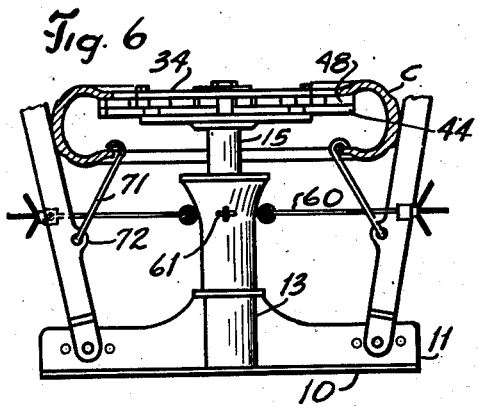
Inventors
CLAUDE A. TALLEY AND
WALTER E. GRISHAM

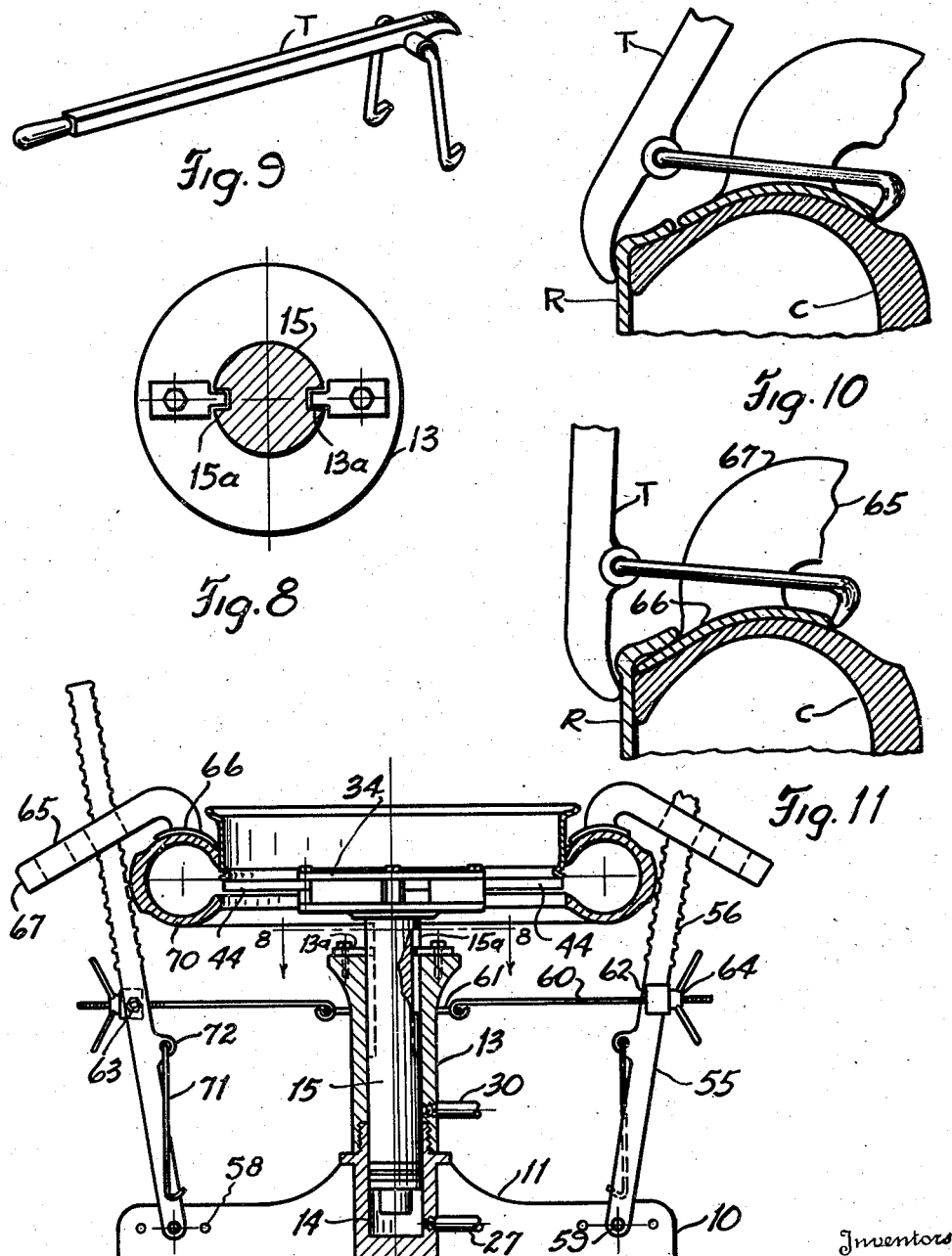

Patented May 28, 1946

2,401,118

UNITED STATES PATENT OFFICE 2,401,118

TIRE REMOVING AND SPREADING DEVICE

Claude A. Talley and Walter E. Grisham,
San Antonio, Tex.

Application July 12, 1943, Serial No. 494,328

2 Claims. (Cl. 157—6)

This invention relates to new and useful improvements in tire removing and spreading devices.

One object of the invention is to provide improved means for readily removing tires from wheels or rims in a minimum amount of time and in the most efficient manner, the means being so arranged that a tire may be easily spread for withdrawal of the tube or inspection of the casing after removal of said tire from its wheel or rim.

An important object of the invention is to provide an improved tire removing and spreading device having means for rigidly supporting wheels or rims of varying diameters together with means for preventing movement of the tire mounted thereon, whereby the wheel or rim may be moved in an axial direction relative to said tire so as to force the former from engagement within the latter.

Another object of this invention is to provide an improved tire removing and spreading device having means for firmly engaging the upper surface of a tire at its inner peripheral portion to hold the tire stationary and prevent rolling of the bead thereof during relative demounting movement of the wheel or rim upon which said tire is mounted, the means being adjustable vertically and radially as well as being adapted to be held and tightened in its adjusted positions so as to assure positive engagement thereof with the tire.

A particular object of the invention is to provide an improved tire removing and spreading device, of the character described, having an adjustable support which includes retractable means adapted to be actuated upon rotation of the support relative to the device, whereby rotation of said support will project and retract the means to provide a supporting medium for wheels and rims of varying diameters.

A further object of the invention is to provide an improved tire removing and spreading device, of the character described, which is so constructed that after removal of a tire from its wheel or rim the tire may be supported by engaging the adjustable support therein and beneath the bead of the upwardly-disposed surface of said tire, there being means for engaging and preventing upward movement of the other or lower bead, whereby said support may be raised to move the beads away from each other and spread the tire so as to readily permit the removal of the tube and/or inspection of the internal surface of the casing.

Still another object of the invention is to provide an improved tire removing and spreading device, of the character described, wherein visible indicating means is provided for denoting the diameter or size of the adjustable support in its adjusted positions.

A construction designed to carry out the invention will be hereinafter described together with other features of the invention.

The invention will be more readily understood from a reading of the following specification and by reference to the accompanying drawings, wherein an example of the invention is shown and wherein:

Figure 1 is a perspective view, partially in section, of a tire removing and spreading device, constructed in accordance with the invention, and shown supporting a mounted tire, Figure 2 is a plan view of adjustable support with the arms partially projected, Figure 3 is an enlarged, transverse, vertical, sectional view, taken on the line 3—3 of Figure 2, with the arms completely retracted, Figure 4 is a horizontal, cross-sectional view, taken on the line 4—4 of Figure 3, Figure 5 is a view, similar to Figure 4, looking in the opposite direction, Figure 6 is a reduced elevation of the device, showing the use of the same in spreading a tire, Figure 7 is a view, partly in section and partly in elevation, illustrating the removal of a tire from a rim subsequent to the removal of the lock rim, Figure 8 is a horizontal, cross-sectional view, taken on the line 8—8 of Figure 7, Figure 9 is an isometric view of the tool employed in properly positioning the tire-engaging elements, and Figures 10 and 11 are enlarged, detailed views, showing the use of the tool.

This application is filed as a continuation-in-part of our abandoned co-pending application, Serial No. 446,294, filed June 8, 1942.

In the drawings, the numeral 10 designates a frame or base having radial cross-arms or members 11 which are preferably disposed in the form of a cross. The cross-arms may be of any suitable construction, being shown as formed of angle iron, and a semi-circular plate 12 underlies several of said cross-arms, preferably extending from one cross-arm to its diametrically-opposed cross-arm and being secured thereto by welding or other suitable means. A cylindrical, upright housing 13 projects axially and upwardly from the central portion of the base and the inner ends of the cross-arms are secured to the exterior thereof by welding, or other suitable means. As shown in Figure 7, a hydraulic cylinder 14 is formed within the housing 13 and an elongate plunger or rod 15 is slidably disposed therein. The plunger 15 is of greater length than the cylinder 14 so as to project a slight distance above the upper end thereof and is prevented from rotating relative thereto by keys 13a secured to the upper end of the housing and engaging within vertical channels or grooves 15a formed in the upper portion of said plunger (Figs. 7 and 8).

For elevating the plunger, a hydraulic pump 16 is mounted on the plate 12 and includes an upright cylinder 17 having its enlarged, annular flange or base 18 secured to said plate by suitable bolts 19. A piston (not shown) is reciprocatably mounted within the cylinder 17 and has its rod 20 extending from the upper end thereof and secured by a suitable clevis 21 to the intermediate portion of a hand lever 22. A link 23 pivotally connects the inner end of the lever 22 to an arm or bracket 24 which projects from the exterior of the cylinder 17, whereby swinging of said lever will raise and lower the rod 20 so as to reciprocate the piston within said cylinder. Hydraulic fluid flows by gravity from a small tank or container 25 mounted on the plate 12 through a line 26 to the lower portion of the cylinder 17. Reciprocation of the piston forces the fluid from the cylinder 17 through a pipe 27 to the lower portion of the cylinder 14 below the plunger 15. Suitable check valves 28 and 29 are mounted in the line 26 and pipe 27, respectively, for preventing backflow therethrough. A pressure-equalizing line 30 extends from the upper portion of the cylinder 14 to the upper end of the tank 25 for establishing communication therebetween.

Thus, hydraulic fluid under pressure may be drawn from the tank 25 and forced into the cylinder 14 upon manipulation of the pump 16 so as to raise the plunger 15. Due to the provision of a by-pass line 31 which extends from the tank 25 to the pipe 27 intermediate the cylinder 14 and the check valve 29, the weight of the plunger is sufficient to lower the same. A manual control valve 32 is mounted in the line 31 and this valve is closed during reciprocation of the pump and upward movement of the plunger. By opening the valve 32, the hydraulic fluid within the cylinder 14 below the plunger is permitted to drain back into the tank 25. Thus, the plunger is raised by the pressure of the hydraulic fluid and lowered by gravity. Due to the provision of the pressure-equalizing line 30 which permits the fluid to escape from the upper portion of the cylinder 14 into the upper end of the tank 25, the upward travel of the plunger is limited and expulsion thereof from this cylinder is prevented. In other words, the plunger will be lifted until its lower end passes the line 30 so as to uncover the same and permit exhaustion of said fluid from the cylinder.

As is clearly shown in Figure 3, the upper extremity of the plunger 15 is reduced in diameter to provide an upset shoulder 33 for receiving an adjustable wheel or rim supporting unit 34 which includes a pair of superimposed, spaced, annular plates 35 and 36 fastened together by a plurality of suitable bolts 37. For properly spacing the plates, a tubular sleeve or spacer 38 is confined upon each bolt 37 and is interposed between said plates. An annular reinforcing member or disk 39 is welded or otherwise secured to the undersurface of the bottom plate 36 so as to engage and be supported by the shoulder 33. The plate and member 39 are axially alined and have a bearing collar or bushing 40, of bronze or other suitable material, interposed between their inner peripheries and the reduced portion of the plunger 15. The collar 40 is of a length substantially equal to the combined thickness of the plate 36 and member 39, whereby its upper end terminates substantially flush with the upper surface of said plate and said bushing provides a bearing which permits rotation of the plate and member relative to the plunger 15.

Above the plate 36 and collar 40, the diameter of the plunger is again reduced to form an axial stub or counter-shaft 41 which receives a cog or pinion 42 keyed or otherwise secured thereto as shown in Figures 4 and 5. The upper end of the shaft 41 is screw-threaded and is engaged by a suitable nut 43 for confining the cog 42 thereon and in engagement with the upset shoulder formed by the provision of said shaft. A plurality of elongate, flat arms or bars 44 are disposed within the plates 35 and 36 and each arm has a gear rack 45 formed on its inner marginal portion, the teeth of the rack being in constant mesh with the teeth of the cog 42. The arms are of a length less than the diameter of the plates 35 and 36 and are disposed in pairs, with the arms of one pair being parallel and in horizontal alinement with each other. One pair of arms overlies the other pair and extends at a right angle thereto. As is clearly shown in Figures 4 and 5, each arm extends in a direction opposite to that of its horizontally-alined, parallel arm and is adapted to be moved or slid outwardly in an outward direction upon rotation of the unit 34 relative to the plunger 15 and its shaft 41. For limiting outward movement of the arm 44, a stop lug or enlargement 46 is provided on the inner end thereof adjacent the inner end of the gear rack 45. In order to maintain the teeth of the gear rack 45 meshed with the teeth of the cog 42, an elongate block 47 is disposed externally of and parallel to each arm with its inner longitudinal surface contiguous to the external longitudinal surface of said arm. Each arm has a snug sliding engagement with its respective retaining block 47, whereby said arm is confined between the cog and said block. As shown in Figure 3, the blocks are of slightly greater thickness than the arms and are similarly arranged in pairs, whereby the upper pair overlies and extends across the lower pair as well as the lower arms. Due to the greater thickness of the blocks, the arms engage the horizontal surfaces of said blocks and said arms are spaced vertically from each other to prevent binding of the same. The upper pair of blocks are preferably secured to the top plate 35, while the bottom plate 36 has the lower pair fastened thereto.

The arms are normally confined within the unit 34, but are adapted to be projected upon rotation of said unit relative to the plunger. Rotation of the unit in a clockwise direction will move the arms in such direction and, due to the engagement between the gear racks 45 and the immovable cog 42, said arms will be projected beyond the periphery of said unit. Thus, the supporting area or surface of the unit will be enlarged as shown in Figure 2. In order to retract the arms, it is only necessary to rotate the unit in a counter-clockwise direction. Since the lower pair of arms are disposed in a plane beneath the upper pair, it is preferable to increase or double the thickness of the outer end portions of said lower pair by securing a block 48 of the same thickness to the upper surface of each lower arm as is best shown in Figure 6. Thus, the upper surfaces of the exposed or projecting portions of the arms will be disposed in the same horizontal plane so as to evenly support a wheel or rim. Of course, it is not necessary that the arms 44 be completely projected or retracted as the same may be partially projected. For locking the arms in their adjusted position and also for preventing rotation of the unit 34, a set screw 49, having a manual lever 50 extending laterally from its head, is screw-threaded through an opening in the plate 35 and engages one of the upper bars as shown in Figures 2 and 3.

In order to visibly indicate the position of the arms, an indicating ring or annular disk 51 is supported above the plate 35 by the nut 43 which projects through and a slight distance above said plate. A stud bolt 52 and nut 53 confine the indicating ring 51 in position upon the nut 43 so that said ring is held stationary with said nut. A notch 54 is cut in the external periphery of the ring 51 and overlies suitable indicia provided on the upper surface of the plate 35. The indicia denotes or represents the varying diameter of the unit 34 and its supporting arms 44 from the largest to the smallest possible diameter, which is from a completely projected position of the arms to complete retraction thereof, and said indicia is so arranged relative to the arms that the notch 54 will overlie or be alined with the proper indication. Thus, the unit 34 may be readily rotated to project or retract the arms to the desired diameter by observing the position of the notch 54. Also, the notch serves to visibly indicate the position of the arms when the same are hidden from view.

An elongate, flat bar or leg 55, having corrugations or projections 56 formed on its upper portion, is pivotally connected to each cross-arm 11 by means of a clevis or yoke 57 which is formed on the lower end of the bar. For adjustably positioning the bar 55 relative to the cross-arm, a plurality of spaced openings 58 are formed in the outer end portion of said cross-arm and the openings are adapted to receive a suitable pin 59 which also extends through the clevis 57. The bar is adapted to be held in a substantially upright position by an elongate hook member or bolt 60, the bill of which extends through a U-shaped bracket or staple 61 welded or otherwise connected to the exterior of the housing 13 adjacent its upper end. The outer end of the hook bolt is screw-threaded and is slidably mounted within a bearing block 62 pivotally connected to the bar 55 by a countersunk bolt 63, the latter being preferably horizonally alined with the bolt. A wing nut 64 is screw-threaded upon the bolt 60 and engages the outer surface of the bearing block 62 so as to hold the bar 55 in its adjusted positions.

A tire-engaging element 65 is adapted to be supported by the corrugations 56 of each bar and includes an arcuate plate or shoe 66 which is slightly curved or dished transversely so as to conform to the contour of a tire 70. A supporting arm 67 is preferably made integral with the upper surface of the shoe 66 and projects upwardly therefrom, the arm being bent or curved downwardly upon itself at an angle greater than a right angle as shown at 68 so as to dispose the outer portion thereof below the plane of said shoe. The outer portion of the supporting arm 67 has a pair of slots 69 formed therein for receiving the corrugated portion 56 of the bar 55.

As is clearly shown in Figure 1, the slots 69 are of a length slightly greater than the width of the bar, thereby providing clearance for the corrugations 56 and said bar may extend at an angle through either of said slots. Due to the inclination of the bar 55 and arm 67 relative to each other, it is manifest that the corrugations will engage the end wall of the slot through which said bar projects so as to bind and hold the tire-engaging element in the desired adjusted position. Attention is directed to the fact that a pair of slots have been provided in the supporting arm 67 of the element 65 in order that the shoe 66 may be properly positioned relative to the wheel or rim carrying the tire to be demounted as well as to assure the desired angular relationship between the bar and said arm.

The tire 70 to be demounted includes the usual casing C and tube T and is usually mounted upon a wheel W or rim R, each of the latter having the usual lock rim (not shown) for retaining the tire thereupon. In utilizing the device to demount the tire, the plunger 15 is lowered to its lowermost position by opening the valve 32 in the by-pass line 31. After the plunger has reached its lowermost position, the valve 32 is closed and the tire-supporting unit 34 is rotated in a clockwise direction so as to project the arms 44 to the desired diameter, such diameter being preferably equal to the diameter of the wheel W. The mounted tire is then placed upon the unit 34 with the lock rim L being upwardly disposed. The tire engaging-elements 65 are then placed upon the upper portion of the bars 55 by threading the latter through the desired slot 69. The elements 65 are positioned so that each shoe 66 will extend radially inwardly from its respective bar 55 and engage the upper sidewall of the tire. The arms 67 are then forced downwardly relative to the bars 55 and the shoes are forced inwardly, by a tool T (Fig. 9) or other means, until their inner marginal edge portions engage the rim of the wheel and, more desirably, beneath the lock rim in substantially the manner shown in Figures 10 and 11. The hook bolts 60 are then engaged with the brackets 61 and the wing nuts 64 are tightened so as to force the bars 55 inwardly, whereby the corrugations 56 will frictionally engage the end walls of the slots 69 so as to bind and hold the elements 65 in their adjusted positions. It is desirable for the bars to lightly engage the external periphery of the casing C so as to prevent any transverse movement of the mounted tire.

With the parts in the above-described position, the lever 22 is swung several times so as to reciprocate the pump 16 and force hydraulic fluid under pressure through the pipe 27 and past the check valve 29 into the lower end of the cylinder 14. This fluid under pressure will lift the plunger 15 and the supporting unit 34 a slight distance so as to raise or move the wheel W upwardly relative to the tire 70, thereby relieving the tight engagement between the lock rim and the upper bead of the casing C. The lock rim may now be easily removed. The valve 32 is again manipulated to relieve the fluid from the lower end of the cylinder 14 and permit descension of the plunger. The wing nuts 64 are then loosened and the hook bolts 60 are disengaged from the brackets 61, whereby the arms 67 may be swung upwardly so as to permit removal of the elements 65 from the bars 55.

The mounted tire is then inverted so as to reverse the position thereof and the various parts are reconnected and retightened so as to be in the position shown in Figure 1 or 7. Attention is directed to the fact that the nut 53 which projects above the plate 35 of the unit 34 engages within the axle opening of the wheel so as to center or axially aline the same. Upon closing of the valve 32 and manipulation of the pump 16, the plunger and its supporting unit 34 will again be lifted so as to move the wheel upwardly relative to the tire. Since the lock rim has been removed and the tire is held stationary by the shoes 68, continued upward movement of the wheel will remove and disengage the same from within said tire. As soon as the wheel breaks loose from the casing, the valve 32 is opened so that the fluid may drain from the cylinder 14 into the tank 25. By loosening the wing nuts 64, the elements 65 may be removed from the bars 55 in the manner set forth hereinbefore to permit removal of the tire from the device.

In some instances, it is desirable to spread the casing so as to permit inspection of the internal surface or wall thereof or to facilitate the removal of the tube which may be non-compressible, such as are bulletproof tubes. As shown in Figure 6, the casing may be supported by the unit 34 upon rotating said unit so as to project the supporting arms 44 and engage the same within said casing and beneath one bead thereof. The hook bolts 60 are then connected to the brackets 61 and the wing nuts 64 are tightened so that the bars 55 will lightly engage the external periphery of the casing and axially position the same relative to the unit 34. The lower bead of the casing is engaged by the bills of elongate hooks 71, each hook being pivotally connected to one of the bars 55 by means of an eye 72 preferably formed integral with said bar immediately below the bearing block 62 and bolt 63. The pump 16 is then reciprocated so as to force fluid under pressure into the cylinder 14 and thereby raise the plunger 15 and unit 34. Since the uppermost bead of the casing is engaged by the arms 44 and the lowermost bead of said casing is held stationary by the hooks 71, it is manifest that upward movement of the unit will move the upper bead upwardly away from the lower bead so as to spread the casing. Thus, a non-compressible tube, such as a bullet-proof tube, may be readily removed from and inserted into the casing and/or the internal surface of said casing may be inspected.

From the foregoing, it is readily apparent that an efficient and simple device for removing tires from wheels or rims has been provided. Due to the provision of the adjustable supporting unit 34 with its retractable bars 44, wheels and rims of various diameters within predetermined limits are readily accommodated. The adjustability of the supporting unit is especially important in removing tires from rims, because in order to support the rim the unit must exactly fit the same. Since the arms 44 may be projected, said arms may engage the radial flange or rib of the rim so as to provide a rigid support for said rim. By inverting the wheel or rim and by following substantially the same procedure as set forth hereinbefore, the wheel or rim may be forced into engagement with the internal periphery of said tire. In this operation, the wheel or rim is placed upon the supporting unit and the tire rests upon said wheel or rim. After the proper positioning of the parts, as has been hereinbefore clearly set forth, upward movement of the plunger 15 and the unit 34 by manipulation of the pump 16, will force the wheel or rim upwardly into engagement with the tire. If desired, the lock rim (not shown) may be inserted in position while the parts are held by the device in this relation.

The foregoing description of the invention is explanatory thereof and various changes in the size, shape and materials as well as in the details of the illustrated construction may be made, within the scope of the appended claims, without departing from the spirit of the invention.

What we claim and desire to secure by Letters Patent is:

1. A device of the character described including, a base, a vertically disposed guide member mounted on the base, means carried by said guide member and movable longitudinally thereof, said means having a free end portion extending beyond the guide member, means connecting the guide member and the first-named means for limiting relative longitudinal movement therebetween and for preventing relative rotation with respect to each other, a stationary gear member carried by said free end portion of the first-named means, a rotatable head mounted on the free end portion of the first-named means, adjustable wheel rim engaging and supporting means carried by said head and operatively engaging said gear member so as to be actuated thereby into and out of wheel engaging and supporting position when the head is rotated relative to said gear member, adjustable tire engaging means carried by said base, and means for moving the first-named means and thereby the wheel engaging and supporting means relative to the tire engaging means.

2. A device of the character described including, a base, a vertically disposed cylinder carried by the base, a piston slidably mounted within said cylinder and having a free end portion extending beyond the latter, means connecting the cylinder end piston for limiting relative sliding movement thereof and for preventing relative rotation therebetween, stationary gear means carried by the free end portion of the piston, a rotatable head mounted on the free end portion of the piston, adjustable wheel rim engaging and supporting means carried by said head and operatively engaging the gear means so as to be actuated thereby into and out of wheel engaging and supporting position when the head is rotated relative to said gear means, adjustable tire engaging means carried by said base, and means for moving the piston and thereby the wheel engaging and supporting means relative to said tire engaging means.

CLAUDE A. TALLEY.
WALTER E. GRISHAM.